US009853267B2

(12) United States Patent
Page et al.

(10) Patent No.: US 9,853,267 B2
(45) Date of Patent: Dec. 26, 2017

(54) INTUMESCENT BATTERY HOUSING

(71) Applicant: PYROPHOBIC SYSTEMS, LTD., Barrie (CA)

(72) Inventors: John B. Page, Barrie (CA); Xiaoxiong Luo, Barrie (CA)

(73) Assignee: URSATECH LTD., Barrie (CA)

( * ) Notice: Subject to any disclaimer, the term of this patent is extended or adjusted under 35 U.S.C. 154(b) by 528 days.

(21) Appl. No.: 14/171,450

(22) Filed: Feb. 3, 2014

(65) Prior Publication Data

US 2015/0221914 A1 Aug. 6, 2015

(51) Int. Cl.
*H01M 2/08* (2006.01)
*H01M 2/12* (2006.01)
*H01M 2/10* (2006.01)
*H01M 10/42* (2006.01)
*H01M 10/613* (2014.01)

(52) U.S. Cl.
CPC ....... *H01M 2/1247* (2013.01); *H01M 2/1016* (2013.01); *H01M 2/127* (2013.01); *H01M 2/1252* (2013.01); *H01M 10/4207* (2013.01); *H01M 10/613* (2015.04)

(58) Field of Classification Search
None
See application file for complete search history.

(56) References Cited

U.S. PATENT DOCUMENTS

| | | | |
|---|---|---|---|
| 3,955,330 A | 5/1976 | Wendt | |
| 4,137,376 A | 1/1979 | Clegg et al. | |
| 4,364,210 A | 12/1982 | Flemning et al. | |
| 4,513,173 A | 4/1985 | Merry | |
| 4,630,415 A | 12/1986 | Attwell | |
| 4,754,377 A | 6/1988 | Wenman | |
| 4,888,925 A | 12/1989 | Harbeke | |
| 4,916,800 A | 4/1990 | Harbeke | |
| 5,058,341 A | 10/1991 | Harbeke, Jr. | |
| 5,103,609 A | 4/1992 | Thoreson et al. | |
| 5,129,201 A | 7/1992 | Robertson et al. | |
| 5,174,077 A | 12/1992 | Murota | |

(Continued)

FOREIGN PATENT DOCUMENTS

| | | |
|---|---|---|
| CA | 2786202 A1 | 3/2013 |
| CN | 101656304 A | 2/2010 |

(Continued)

OTHER PUBLICATIONS

Tesla Motors Club, Amazing core Tesla Battery IP—18650 Cell, retrieved from web page: http://www.teslamotorsclub.com/showthread.php/17456-Amazing-Core-Tesla-Battery-IP . . . ; Nov. 18, 2013 (10 pages).

(Continued)

*Primary Examiner* — Tracy Dove
(74) *Attorney, Agent, or Firm* — Marshall, Gerstein & Borun LLP

(57) ABSTRACT

A battery housing has a body and a lid mateable with the body. The body and the lid, when mated, provide a chamber dimensioned to hold at least one battery; and a venting passageway from the chamber. At least a portion of at least one of the body and the lid comprises an intumescent flame retardant material with an expansion ratio sufficient to drive gas from the chamber through the venting passageway and to seal the chamber when the material intumesces in the event of thermal runaway of a battery housed in the chamber.

5 Claims, 10 Drawing Sheets

(56) References Cited

U.S. PATENT DOCUMENTS

| | | | |
|---|---|---|---|
| 5,301,475 | A | 4/1994 | Stefely |
| 5,417,019 | A | 5/1995 | Marshall et al. |
| 5,452,551 | A | 9/1995 | Charland et al. |
| 5,887,395 | A | 3/1999 | Navarro et al. |
| 5,950,376 | A | 9/1999 | Kemeny et al. |
| 6,105,334 | A | 8/2000 | Monson et al. |
| 6,176,052 | B1 | 1/2001 | Takahashi |
| 6,305,133 | B1 | 10/2001 | Cornwall |
| 6,336,297 | B1 | 1/2002 | Cornwall |
| 6,412,243 | B1 | 7/2002 | Sutelan |
| 6,645,278 | B2 | 11/2003 | Langille et al. |
| 6,694,684 | B2 | 2/2004 | Radke et al. |
| 6,725,615 | B1 | 4/2004 | Porter |
| 6,747,074 | B1 | 6/2004 | Buckingham et al. |
| 6,790,893 | B2 | 9/2004 | Nguyen et al. |
| 7,080,486 | B2 | 7/2006 | Badke et al. |
| 7,397,219 | B2 | 7/2008 | Phillips et al. |
| 7,465,888 | B2 | 12/2008 | Fischer et al. |
| 7,470,048 | B2 | 12/2008 | Wu |
| 7,476,010 | B2 | 1/2009 | Johnson |
| 7,486,047 | B2 | 2/2009 | Phillips et al. |
| 7,651,238 | B2 | 1/2010 | O'Brien |
| 7,651,248 | B2 | 1/2010 | Hua |
| 7,670,033 | B2 | 3/2010 | Steer et al. |
| 7,812,253 | B2 | 10/2010 | Moselle |
| 7,913,468 | B2 | 3/2011 | Spais |
| 7,954,974 | B2 | 6/2011 | Johnson |
| 8,146,305 | B2 | 4/2012 | Cordts |
| 8,263,254 | B2 | 9/2012 | Mehta et al. |
| 8,277,965 | B2 | 10/2012 | Hermann et al. |
| 8,367,233 | B2 | 2/2013 | Hermann et al. |
| 8,393,121 | B2 | 3/2013 | Beele |
| 8,397,452 | B2 | 3/2013 | Stahl, Sr. et al. |
| 9,089,716 | B2 | 7/2015 | Peterson et al. |
| 2002/0155348 | A1 | 10/2002 | Gitto |
| 2004/0016190 | A1 | 1/2004 | Radke et al. |
| 2004/0100040 | A1 | 5/2004 | Sakno |
| 2004/0168398 | A1 | 9/2004 | Sakno et al. |
| 2005/0170238 | A1 | 8/2005 | Abu-Isa et al. |
| 2006/0096207 | A1 | 5/2006 | Spais |
| 2006/0234119 | A1 | 10/2006 | Kruger et al. |
| 2008/0011383 | A1 | 1/2008 | Paetow et al. |
| 2009/0218130 | A1 | 9/2009 | Monden et al. |
| 2010/0136391 | A1 | 6/2010 | Prilutsky et al. |
| 2010/0136404 | A1 | 6/2010 | Hermann et al. |
| 2011/0064997 | A1 | 3/2011 | Peskar et al. |
| 2011/0088342 | A1 | 4/2011 | Stahl, Sr. et al. |
| 2011/0262783 | A1 | 10/2011 | Mehta |
| 2011/0281154 | A1 | 11/2011 | Vissers et al. |
| 2012/0022201 | A1 | 1/2012 | Zhvanetskiy et al. |
| 2012/0034501 | A1 | 2/2012 | Hermann et al. |
| 2012/0231318 | A1 | 9/2012 | Buck et al. |
| 2012/0233943 | A1 | 9/2012 | Monden et al. |
| 2012/0304979 | A1 | 12/2012 | Munzenberger et al. |
| 2013/0061545 | A1 | 3/2013 | Van Walraven et al. |
| 2013/0086857 | A1 | 4/2013 | Paetow et al. |
| 2013/0104474 | A1 | 5/2013 | Klein |
| 2013/0118102 | A1 | 5/2013 | Pilz et al. |
| 2013/0143076 | A1 | 6/2013 | Sachdev et al. |
| 2013/0247487 | A1 | 9/2013 | Turner |
| 2014/0077043 | A1 | 3/2014 | Foerg |

FOREIGN PATENT DOCUMENTS

| | | | |
|---|---|---|---|
| DE | 19934902 | A1 | 1/2000 |
| DE | 202012003405 | U1 | 8/2013 |
| DE | 102013203173 | A1 | 10/2013 |
| EP | 0635665 | B1 | 3/1997 |
| EP | 1273841 | A1 | 1/2003 |
| EP | 2572760 | A2 | 3/2013 |
| GB | 2077382 | A | 12/1981 |
| GB | 2108614 | A | 5/1983 |
| GB | 2422191 | A | 7/2006 |
| GB | 2459538 | A | 4/2009 |
| GB | 2471929 | A | 1/2011 |
| GB | 2495009 | A | 3/2013 |
| GB | 2515649 | A | 12/2014 |
| GB | 2517222 | A | 2/2015 |
| KR | 20070023293 | A | 2/2007 |
| WO | 2011/124886 | A2 | 10/2011 |
| WO | 2012/080758 | A2 | 6/2012 |
| WO | WO-2013/045937 | A2 | 4/2013 |
| WO | 2013/145790 | A1 | 10/2013 |
| WO | 2014/013265 | A1 | 1/2014 |

OTHER PUBLICATIONS

Proquest Dialog, Flame Retardancy News 14.11 (Nov. 2004), Great Lakes Intros New Intumescents, retrieved from web page: http://search.proquest.com/professional/docview/671320957/141D2914C631D147EDD/6 . . . , Nov. 18, 2013 (2 pages).

Tremco Illbruck Coating Ltd., "B600 Intumescent Pipe Sleeve", Jun. 2010, retrieved Dec. 10, 2013 at: http://www.nullifirefirestopping.co.uk/celumdb/documents/Nullifire_B600_DS_GB_19530.pdf, (4 pages).

PFC Corofil, "PFC Corofil Intemescent Conduit", retrieved Dec. 10, 2013 at: http://www.pfc-corofil.com/sites/default/files/products/downloads/pfc_corofil_intumescent_conduit.pdf, (1 page).

Fischer Fixing Systems, "Fischer Conduit intumescent—FCi", retrieved Dec. 10, 2013 at: https://www.byko.is/media/fischer/15_-_fischer_Conduit_Intumescent.pdf, (1 page).

ENIA (Energy Networks & Industrial Applications), "Fire stop barriers FIRE-Stop", retrieved Dec. 10, 2013 at: http://www.enia.gr/wp-content/uploads/2012/07/FireBarriersRaytechCatal_SIGGR.pdf, (7 pages).

The Sparks Direct Blog, "Aurora Fire Rated Downlights: How are they tested and how do they work?", retrieved Sep. 26, 2013 at: http://blog.sparksdirect.co.uk/tag/building-regulations/, (8 pages).

ISE Fire Products & Services Ltd., "Intumescent Fire Protection Products", 2013, retrieved Sep. 26, 2013 at: http://www.isefireproducts.co.uk/intumescent-products, (2 pages).

Kidde Fire Protection Services, "Intumescent Fire Seals Product Range", retrieved Sep. 26, 2013 at: http://www.kiddefps.com/utcfs/ws-407/Assets/Intumescent%20Fire%20Seals.pdf, (31 pages).

Pemko Manufacturing Co., Inc., "Adhesive Gasketing (AG): Adhesive-Backed Fire/Smoke Gasketing", retrieved Sep. 26, 2013 at:http://www.pemko.com/index.cfm?event=products.productListing&searchName=Search+by+Pemko+Product+Number&openFilter=loadPemkoPartNumberSearch&partNumber=s773&partCategoryIds=S773D%3A895, (6 pages).

Trademark Hardware, "Adhesive Weatherstrip, 5/16" Wide Silicone and Intumescent Fin", retrieved at: Sep. 26, 2013 at: http://www.tmhardware.com/Adhesive-Weatherstrip-Gasketing-Intumescent-Fin.html, (2pages).

Machine-generated English translation by EPO and Google, Description of EP1273841, Züll, Armin, "The invention relates to a fire sleeve", Jan. 8, 2003 (11 pages).

Machine-generated English translation by EPO and Google, Description DE19934902, Haupt, Gabriele, "The invention relates to a foreclosure of pipes, cables and ducts through walls or ceilings, as well as joints, columns and wall openings", Jan. 27, 2000 (7 pages).

Machine-generated English translation by EPO and Google, Description of DE202012003405, Doyma GMBH & Co., "The invention relates to a wrapping tape for the fire-resistant sealing of pipe passages, with a first and an opposite second side having an intumescent material under heat", Aug. 29, 2013 (33 pages).

Machine-generated English translation by EPO and Google, Description of DE102013203173, Chikatimalla, Rajesh, "The invention relates to a wrapping tape for the fire-resistant sealing of pipe passages, with a first and an opposite second side having an intumescent material under heat", Oct. 10, 2013 (29 pages).

INTUMESCENT BATTERY HOUSING

BACKGROUND

This relates to a battery housing made from an intumescent flame retardant material that intumesces in the event of a thermal runaway of a housed battery.

Batteries have long been used as mobile power sources. In recent years, advancements have increased the power density of both primary (non-rechargeable) and secondary (rechargeable) batteries. For example, the power density of primary lithium batteries has reached 4.32 MJ/L, while the power density of secondary lithium ion batteries has reached 2.63 MJ/L. As a result, the use of lithium and lithium ion batteries has become wide spread in a variety of applications, including consumer electronics, medical devices, industrial equipment, and hybrid/electric automobiles.

However, many batteries, and particularly lithium and lithium ion batteries, are vulnerable to thermal runaways, during which heat and gas are rapidly discharged from a battery and a fire hazard is created. A thermal runaway may be caused by manufacturing defects, accumulation of heat, internal short circuits, or external impacts or trauma. Further, a thermal runaway of a single battery may trigger the thermal runaway of adjacent batteries, and thereby cause a dangerous chain reaction.

It is known to apply a fire-resistant coating to batteries or to enclose batteries within fire-resistant walls. However, a fire-resistant coating or wall often does not provide sufficient thermal insulation to prevent a thermal runaway from causing further thermal runaways of other batteries kept in close proximity. In fact, some fire-resistant materials used for coatings or walls, such as mica, have relatively high thermal conductivity. It is also known to apply an intumescent coating to batteries. However, intumescent coatings typically cannot be applied in a layer thick enough to overcome the drawbacks mentioned above. In any event, applying a coating introduces an additional manufacturing step. Further, the functionality of a coating may be compromised by scratching or peeling.

SUMMARY

To limit the consequences of a thermal runaway of a battery, battery housings incorporating an intumescent flame retardant material that intumesces in the event of a thermal runaway of a housed battery are provided.

In an aspect, there is provided a battery housing having a body and a lid mateable with the body. The body and the lid, when mated, provide a chamber dimensioned to hold at least one battery and a venting passageway from the chamber. At least a portion of at least one of the body and the lid comprises an intumescent flame retardant material with an expansion ratio sufficient to drive gas from the chamber through the venting passageway and to seal the chamber, when the material intumesces in the event of thermal runaway of a battery housed in the chamber.

In another aspect, there is provided a battery housing having a body and a lid mateable with the body. The body and the lid, when mated, provide a plurality of battery chambers, each dimensioned to hold at least one battery, and a plurality of venting passageways, each venting passageway extending from one battery chamber of the plurality of battery chambers. At least a portion of at least one of the body and the lid comprises an intumescent flame retardant material with an expansion ratio sufficient to drive gas from any given battery chamber of the plurality of battery chambers through at least one of the plurality of venting passageways, and seal the given battery chamber, when the material intumesces in the event of thermal runaway of a battery housed in the given battery chamber.

Other features will become apparent from the drawings in conjunction with the following description.

DETAILED DESCRIPTION

Figures 1A, 1B:
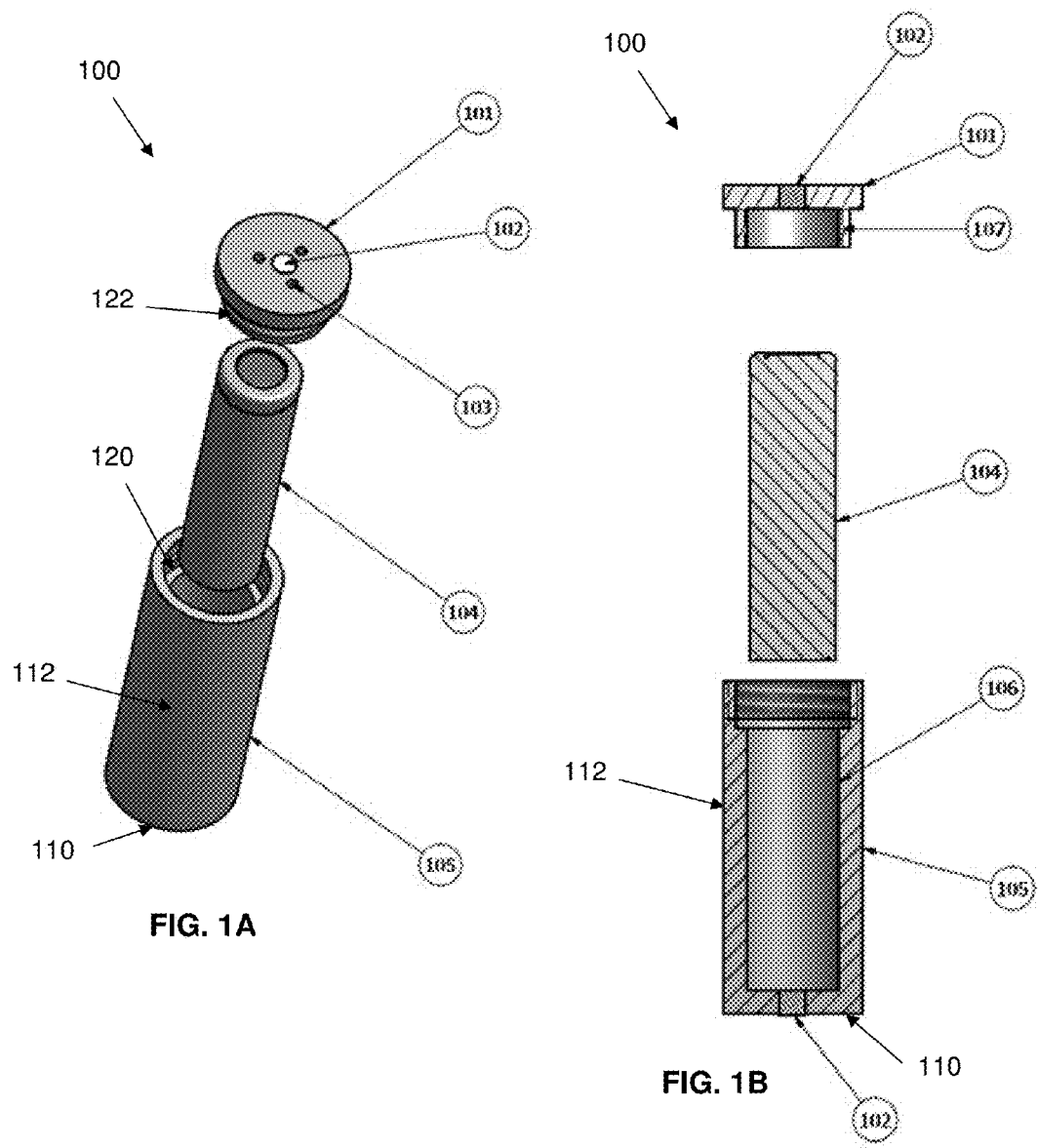
FIG. 1A is an exploded perspective view of a battery housing adapted to hold a battery.
FIG. 1B is an exploded cross-sectional view of the battery housing of FIG. 1A.

FIGS. 1A and 1B depict a battery housing 100 adapted to hold a battery 104. Housing 100 has a body 105 and a removable lid 101. Body 105 has a flat bottom 110 and a substantially cylindrical sidewall 112 defining a cavity 106 for receiving battery 104. When lid 101 is mated to body 105, lid 101 covers cavity 106 to form a chamber 108 substantially enclosing a battery received in cavity 106. As depicted, battery 104 is a conventional lithium or lithium ion format 18650 battery. Chamber 108 is substantially cylindrical in shape and is sized to fit one format 18650 battery.

Bottom 110, cylindrical sidewall 112, and lid 101 are fabricated of an intumescent flame retardant (IFR) material, as detailed below. This IFR material intumesces in the event of a thermal runaway of battery 104 to entomb battery 104 within chamber 108 and prevent the thermal runaway from spreading to any other batteries.

As depicted, bottom 110, sidewall 112, and lid 101 are about 6.5 mm thick. In other embodiments, this thickness may be between about 0.5 mm to 50 mm. As will become apparent, bottom 110, sidewall 112, and lid 101 are formed to have a thickness that provides sufficient structural integrity and thermal insulation in the event of a thermal runaway. Therefore, the thickness of bottom 110, sidewall 112, and lid 101 depends on the material(s) from which lid 101 and body 105 are formed. Such materials are described in more detail hereinafter.

As depicted in FIG. 1, lid 101 includes three through-holes 103 for venting gas, heat, and pressure in the event of a thermal runaway of battery 104. Each through-hole 103 provides a venting passageway that extends between chamber 108 and the exterior of housing 100. As will be detailed below, through-holes 103 are self sealing in the event of a thermal runaway of battery 104. Optionally, each venting passageway may be blocked by a blockage (not shown) to form a blind-hole. Such a blockage, which is described in more detail hereinafter in connection with another embodiment, fails when exposed to pressure created in chamber 108 during a thermal runaway, thereby converting a blind-hole to a through-hole.

Housing 100 includes two connectors 102 that allow electrical connection to battery 104 when held in chamber 108. Thus, housing 100 may be used to hold battery 104 during operation of battery 104 (e.g., charging or discharging). Each connector 102 includes a conductor that extends through housing 100, e.g., through bottom 110 or lid 101 (FIG. 1B). One end of each conductor is positioned to contact a corresponding electrode of battery 104 when held in chamber 108, and the other end of each conductor is positioned to provide a contact external to housing 100. Connectors 102 may be formed using an insert injection molding process to embed a conductor (e.g., a metal plug) in lid 101 or body 105.

Lid 101 is securely fastenable to body 105 to retain heat/fire within chamber 108 in the event of a thermal runaway of battery 104. To this end, in the depicted embodiment, body 105 has interior screw threads 120 at its top end adapted to engage with complementary screwed threads 122 of lid 101. Threads 120 and 122 allow lid 101 to be securely screwed to the top end of body 105. In other embodiments, lid 101 may be secured to body 105 in other ways, e.g., by way of clips, magnets, screws, bolts, or the like.

As noted, body 105 and lid 101 are made using an IFR material that includes one or more IFR polymer composites. Suitable IFR polymer composites may include base polymers, fire retardants, and blowing agents. If the base polymers are inherently fire retardant, such as PVC, CPVC, halogenated polyethylene Neoprene and phenolic resin, then the fire retardants can be omitted from the composite. Synergists such as antimony oxides and/or zinc borate can be added to improve the fire retardancy of a composite. Char-forming agents can be added to promote charring and increase yield (i.e., final volume after intumescence), and thereby improve the fire retardancy and thermal insulation of a composite. Optionally, other components such as smoke suppressants, pigments, and compatibilizers can also be added.

Suitable blowing agents include, but are not limited to, expandable graphites, intumescent alkali metal hydrated silicates, and intumescent alkali metal hydrated silicates with certain amount of other components such as those described in U.S. Pat. No. 6,645,278, the contents of which are incorporated herein by reference. The start expansion temperature (SET) of suitable blowing agents may vary between 130° C. to 300° C. When expandable graphite is used as a blowing agent, electrically-insulating pads should be positioned between the surfaces of chamber 108 and the electrodes of any batteries held in chamber 108 to prevent a short circuit. Other suitable blowing agents will also be apparent to those of ordinary skill in the art. Blowing agents in the composite are generally used in amount of about 1 weight percent (wt %) to about 70 wt %.

Suitable fire retardants include, but are not limited to, polymeric halogen, monomeric halogen, alumina trihydrate, magnesium di-hydroxide, mica, talc, calcium carbonate, hydroxycarbonates, phosphorus compounds, red phosphorus, borate compounds, sulfur compounds, nitrogen compounds, silica, and/or various metal oxides. Other suitable fire retardants will also be apparent to those of ordinary skill in the art. The concentration of the fire retardants in a composite generally varies from 5 wt % to 55 wt %.

Suitable base polymers include, but are not limited to, thermoplastics, such as polyethylene, polypropylene, polyamide, ABS, polybutylene terephthalate, polyethylene terephthalate, EVA, thermosetting plastics, and elastomers, such as epoxy, Neoprene, cross-linked polyethylene, silicone, NBR, thermoplastic elastomers, or the blend of above. Other suitable base polymers will be apparent to those of ordinary skill in the art.

A mixture of the different components described above can be compounded into a composite. This composite can in turn be formed into desired geometries by known polymer processing methods such as injection molding, insert injection molding, extrusion, compression molding, blowing molding, transfer molding, calendaring, rotation molding, thermoforming, or the like. The melting temperature of the base polymers should be lower than the SET of the blowing agents in the composite. The temperature between the melting temperature of the base polymers and the SET of the blowing agents is the processing window for the composite. An IFR polymer composite formulated to have an expansion ratio of between 1.2 and 400 is suitable.

During a thermal runaway of battery 104, a large amount of heat is rapidly generated. This causes the temperature of portions of battery 104 to rise significantly. In some cases, during a thermal runaway, the temperature in battery 104 may increase to about 900° C., with localized hot spots reaching up to 1500° C. At the same time, the thermal runaway generates a large volume of gas.

Battery 104, as is conventional, includes a venting mechanism within its cap assembly. This venting mechanism can discharge pressurized gas generated by a thermal runaway, and regulates the internal gas pressure of battery 104.

Unfortunately, the venting mechanism of battery 104 does not address the heat hazard created by a thermal runaway. In particular, a localized hot spot generated by a thermal runaway may perforate an exterior wall of battery 104 and allow heat/fire to spread. However, as detailed below, housing 100 intumesces in response to a thermal runaway of battery 104, to entomb battery 104 within chamber 108 and prevent heat/fire from spreading.

In particular, in the event of a thermal runaway of battery 104, the venting mechanism of battery 104 discharges gas, heat, and pressure into chamber 108. Heat accumulating in chamber 108 causes the temperature of its surfaces (i.e., interior surfaces of body 105 and lid 101) to rise significantly. When the temperature of such surfaces reaches the SET of the blowing agent in the IFR polymer composite(s) of body 105 or lid 101, body 105 or lid 101 will intumesce and char. The expansion ratio of the IFR material of body 105 and lid 101 is sufficient to cause expanding char to occupy any space in chamber 108, and thereby drive gas out of chamber 108 by way of through-holes 103. Driving gas from chamber 108 quickly quenches any developing fire. Further, the endothermic intumescent reaction of the IFR polymer composite material of lid 101/body 105 will also absorb a large amount of heat while expanding.

After gas has been driven from chamber 108, the above-noted expansion ratio is sufficient to cause the expanded char to seal through-holes 103, thereby entombing battery 104 within chamber 108 to form a "dead cell".

Quickly quenching any developing fire in chamber 108 mitigates heat generation of a thermal runaway, as does the endothermic nature of the intumescent reaction. Further, charring of body 105/lid 101 improves thermal insulation around chamber 108. Each of these mechanisms minimizes the heat conducted out of chamber 108, for example, to any adjacent batteries and prevents a thermal runway of battery 104 from inducing thermal runaway of those adjacent batteries. A chain reaction is thereby avoided.

Conveniently, multiple batteries can be safely placed in close proximity within respective housings 100. For example, multiple batteries may be organized in close proximity to form battery packs/modules during storage, transportation, or operational use of the batteries.

Figure 2:
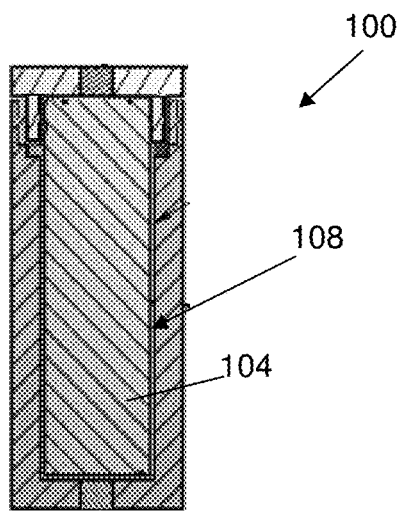
FIG. 2 is a cross-sectional view of the battery housing of FIG. 1A with its lid and body mated.
Figure 2A:
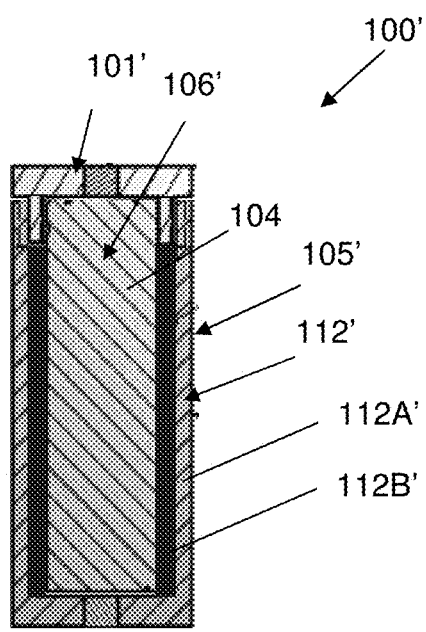
FIG. 2A is a cross-sectional view of a battery housing according to a second embodiment.

FIG. 2A illustrates a modified embodiment wherein the sidewall 112' of body 105' of housing 100' has an outbound portion 112A' and an inbound portion 112B'. In this embodiment, only the inbound portion 112B' of the sidewall of body 105' is made of an IFR material. The remainder of the body 105' and lid 101' are fabricated of other materials, such as metal. The inbound portion 112B' of the sidewall may be a liner which is either integral with the outbound portion 112B' of the sidewall or separable from it. Where the liner is separable, it may be fabricated of an IFR material which is flexible, such as an IFR foam, so that the liner may be wrapped around a battery 104 and then the liner and battery inserted in cavity 106' of the housing 100'. In either instance, the IFR material of the liner is chosen to have an expansion ratio sufficient to drive out gas from the battery chamber and seal the battery chamber in the event of thermal runaway of the battery held in the chamber.

Figure 3:
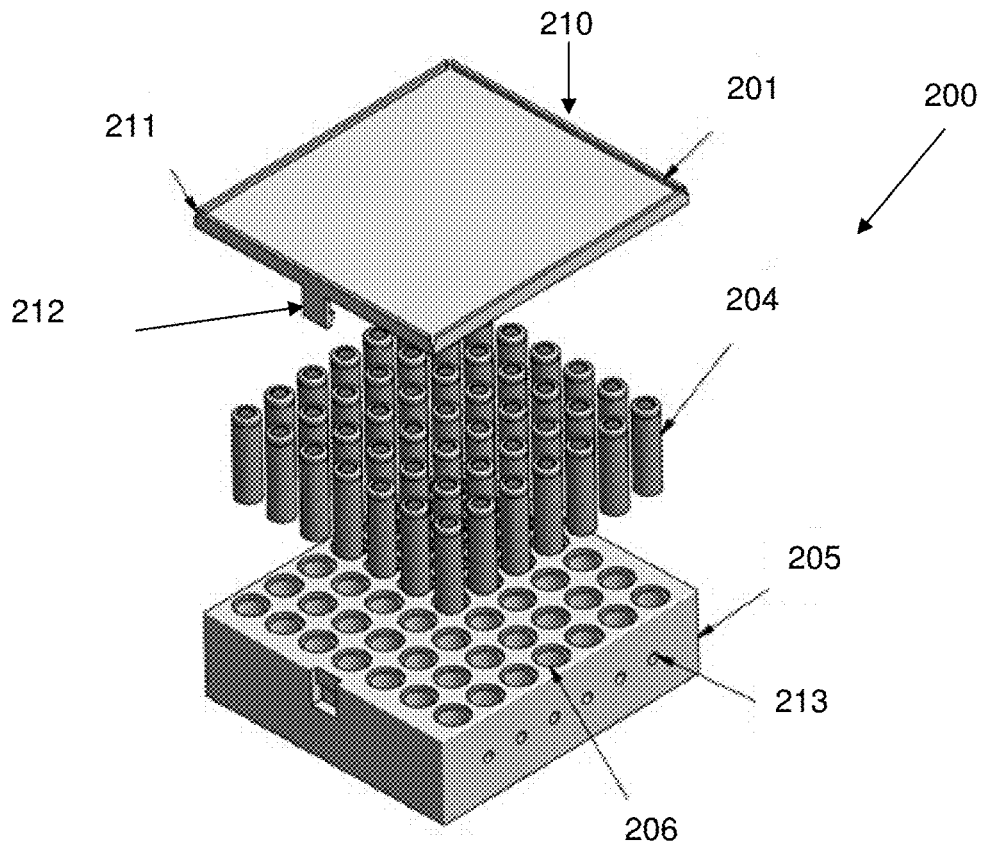
FIG. 3 is an exploded perspective view of a battery housing adapted to house a plurality of batteries.

FIG. 3 depicts a battery housing 200, exemplary of another embodiment. Whereas battery housing 100 is adapted to hold one battery, battery housing 200 is adapted to hold a plurality of batteries. In particular, as depicted, battery housing 200 is adapted to hold up to forty-nine format 18650 batteries (e.g., batteries 204).

Housing 200 has a body 205 and a removable lid 201. Body 205 is substantially square in shape and includes forty-nine cavities 206 arranged in a grid, each for receiving one of batteries 204. Of course, in other embodiments, body 205 may include a greater number or a fewer number of cavities, and the grid shape may vary. Each cavity 206 is spaced from adjacent cavities by a distance of approximately 6.5 mm. Cavities 206 around the perimeter of body 205 are spaced from the perimeter of body 205 by a distance of approximately 6.5 mm.

Figure 4:
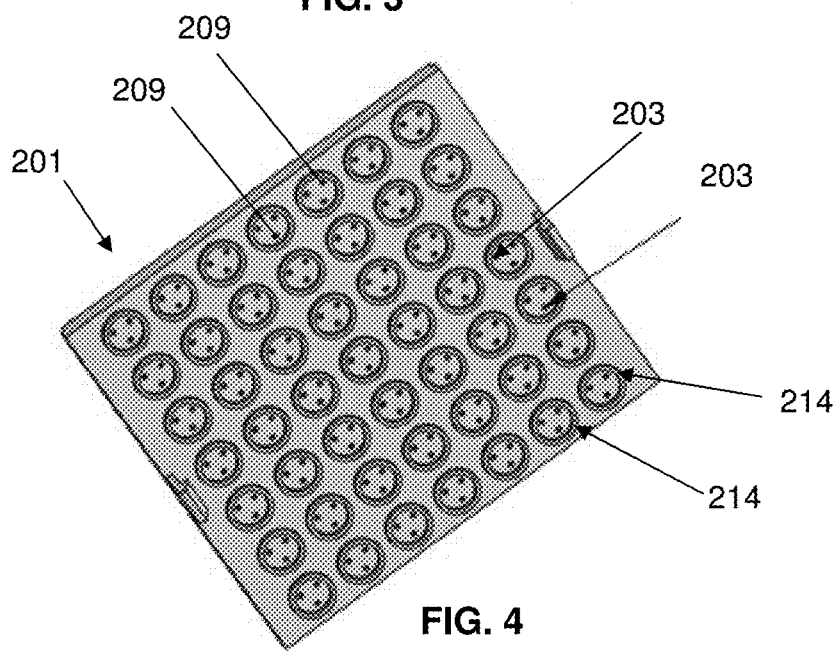
FIG. 4 is a bottom view of the lid of the battery housing of FIG. 3.

Referencing FIG. 4 along with FIG. 3, removable lid 201 is substantially flat. However, the bottom of removable lid 201 has an array of circular lips 214, each of which registers with one cavity 206 when lid 201 is mated to body 205. The circular rim of each cavity 206 is chamfered so that a lip 214 will nestle into the rim when lid 201 is mated to body 205. Thus, when lid 201 is mated to body 205, lid 201 closes each cavity 206 to form a plurality of chambers substantially enclosing batteries received in cavities 206. Such chambers are similar to chambers 108 (FIG. 2); for example, each chamber defined by lid 201 and body 205 is substantially cylindrical in shape and is sized to fit one format 18650 battery.

Lid 201 includes a plurality of blind-holes 203 for venting gas, heat, and pressure in the event of a thermal runaway. As depicted, blind-holes 203 are arranged such that three blind-holes 203 are aligned with each cavity 206. In this way, each chamber defined by lid 201 and body 205 is connected to three blind-holes 203. Each blind-hole 203 includes a venting passageway that extends between one chamber and the exterior of housing 200. These venting passageways are blocked by one or more blockages adapted to fail when exposed to pressure created by the pressure created in a chamber during a thermal runaway of a battery held in that chamber, thereby converting a blind-hole 203 to a through-hole. In the depicted embodiment, the blockage of each venting passageway is a thin wall 209 integral to lid 201 and having a thickness such that it is broken by the pressure created in a chamber during a thermal runaway of a battery held in that chamber. As depicted in FIG. 3, these thin walls 209 prevent venting passageways from being visible from the top of lid 201. Thin walls 209 may be formed integrally with lid 201 using an injection molding process and a suitable mold. As such, thin walls 209 may be formed of the same material as the remainder of lid 201. In other embodiments, walls 209 may be replaced with a thin film applied and bonded to the top surface of lid 201.

Lid 201 includes an upwardly projecting lip 210 extending about the perimeter of lid 201 to provide a space above housing 200 when stacked, e.g., when another battery housing is stacked on top of housing 200. In the depicted embodiment, the space provided above housing 200 may have a height of approximate 4.0 mm. In another embodiment, housing 200 may alternatively or additionally include a lip that projects downwardly from the bottom of housing 200 to provide a space below housing 200 when stacked, e.g., when housing 200 is stacked on top of another battery housing.

Lip 210 may include one more interruptions, each providing a gap 211 to allow gas and pressure to vent out of the space above/below housing 200 in the event of a thermal runaway of a battery held therein. As depicted, gaps 211 are located at the four corners of lid 201. When multiple stacks of housings are placed side-by-side, gas may travel from the space above/below a housing 200 to the space above/below an adjacent housing. In this way, pressure can be equalized among adjacent stacks of housings.

In some embodiments, gaps 211 may be omitted such that the space above/below housing 200 is substantially sealed when the housing 200 is stacked with other housings. Such embodiments may be suitable if housing 200 is expected to be used proximate to flammable materials (e.g., styrofoam or cardboard boxes). Sealing gas within the space above or below the housing 200 helps prevent such flammable materials from being ignited by gas/heat vented during a thermal runaway.

Lid 201 is securely fastenable to body 205 by way of one or more snap-fit clips 212. In other embodiments, lid 201 may be secured to body 205 in other ways, e.g., by way of screws, magnets, bolts, or the like.

Body 205 includes a plurality of spaced transverse channels 213 that extend through body 205 beneath cavities 206, from one side of body 205 to an opposite side of body 205. Channels 213 are adapted to receive cooling conduits (not shown in FIGS. 3 and 4) that provide thermal communication between the interior and exterior of body 205. These cooling conduits transfer waste heat generated by batteries 204 during operational use (e.g., charging or discharging) out of housing 200. The cooling conduits can also transfer heat generated during a thermal runaway out of housing 200. Suitable cooling conduits can be made from a high heat conductivity material, such as metal. Optionally, the cooling conduits can be made from a fire-resistant material.

Housing 200 may include a plurality of interior electrical connectors (not shown) that allow some or all of batteries 204 held in housing 200 to be connected according to predefined series and/or parallel arrangements. Housing 200 may also include connectors similar to connectors 102 (FIG. 1B) that allow electrical connections to be made between some or all of batteries 204 and the exterior of housing 200. Electrical connectors may be formed in housing 200 using an insert injection molding process.

Lid 201 and body 205 of housing 200 can be made from the same IFR polymer composite materials suitable for forming lid 101 and body 105 of housing 100 (FIG. 1A), discussed above. In the event of a thermal runaway of one of batteries 204 held in housing 200 (hereinafter, the "event" battery), gas, heat, and pressure are discharged into one of the chambers of housing 200 (hereinafter, the "event" chamber). This will cause the IFR material surrounding the event chamber to increase in temperature. When this temperature reaches the SET of the IFR material, the material will expand and char. At the same time, elevated pressure in the event chamber will break the thin walls 209 covering the blind-holes 203 connected to the event chamber, thereby converting those blind-holes 203 into through-holes that allow gas, heat, and pressure to vent out of housing 200. When housing 200 is stacked, the gas, heat, and pressure may enter the aforementioned space above housing 200, whereupon the gas, heat, and pressure may be further vented away from housing 200 by way of gaps 211.

The expansion ratio of the IFR material surrounding the event chamber is sufficient to cause expanding char to occupy any space in the event chamber, and thereby drive out gas from the event chamber by way of the above-noted through-holes converted from blind-holes 203. This quickly quenches any developing fire in the event chamber. Further, after gas has been driven out of the event chamber, the expanded char seals the through-holes connected to the event chamber, and thereby entombs the event battery within the event chamber, forming a "dead cell." The endothermic intumescent reaction of the IFR material of housing 200 absorbs heat during expansion. Further, cooling conduits received in channels 213 may transfer heat created by the thermal runaway out of housing 200. In these ways, batteries held in the other chambers of housing 200 are protected from heat generated by the thermal runaway in the event chamber.

Batteries held in any adjacent housings are likewise protected from heat generated by the thermal runaway in the event chamber. Further, if heat discharged from housing 200 heats any IFR material of an adjacent housing beyond the SET of the IFR material of that adjacent housing, expansion in the adjacent housing will provide further protection.

Figure 5:
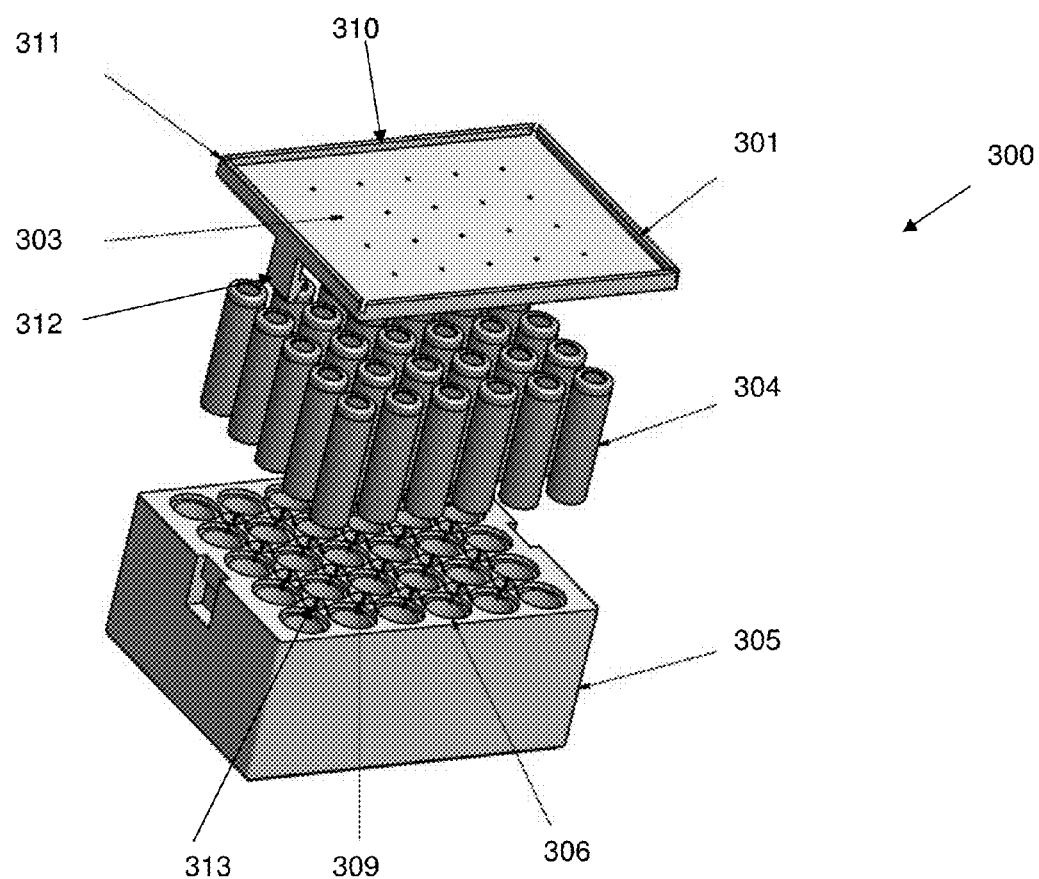
FIG. 5 is an exploded perspective view of a battery housing adapted to house a plurality of batteries, in accordance with an alternate embodiment.
Figure 6:
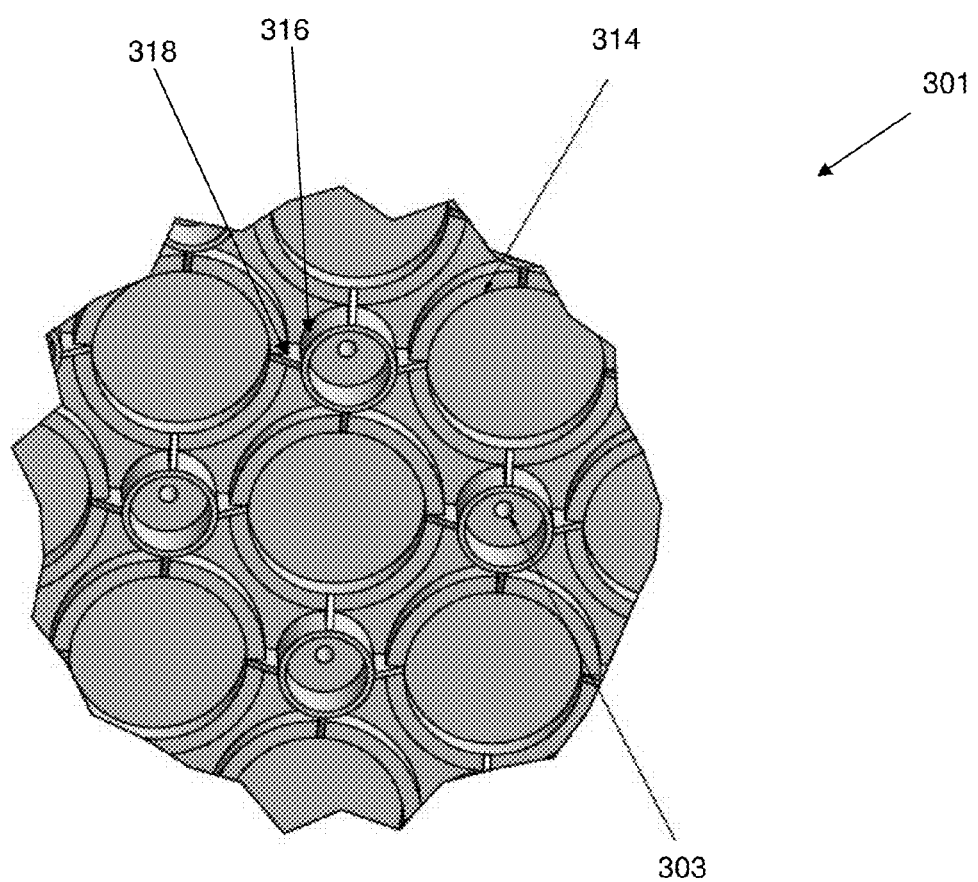
FIG. 6 is a partial bottom view of the lid of the battery housing of FIG. 5.
Figure 7:
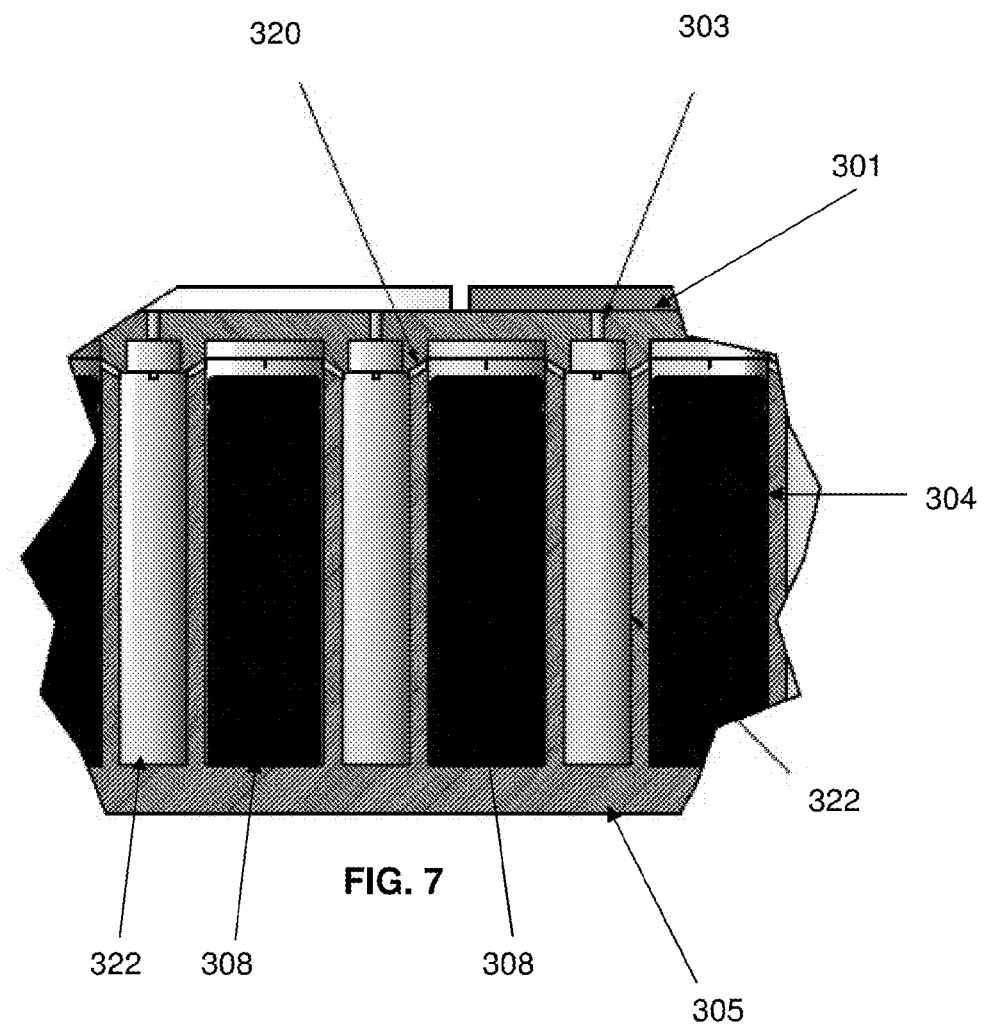
FIG. 7 is a partial cross-sectional view of the battery housing of FIG. 5 with its lid and body mated.

FIGS. 5-7 depict a battery housing 300, exemplary of a further embodiment. Like battery housing 200 (FIG. 3), battery housing 300 is adapted hold a plurality of batteries. In particular, as depicted, battery housing 300 is adapted to hold up to thirty format 18650 batteries (e.g., batteries 304).

Housing 300 has a body 305 and a removable lid 301. Like body 205 (FIG. 3), body 305 includes a plurality of cavities arranged in a grid, each for receiving a battery. In particular, as depicted in FIG. 5, body 305 includes thirty battery cavities 306, each for receiving one of batteries 304. In other embodiments, body 305 may include a greater number or a fewer number of battery cavities 306, and the grid shape may vary. Each battery cavity 306 is spaced from adjacent battery cavities 306 by a distance of approximately 6.5 mm. Battery cavities 306 around the perimeter of body 305 are spaced from the perimeter of body 305 by a distance of approximately 6.5 mm.

Unlike body 205 (FIG. 3), in addition to cavities for receiving batteries, body 305 also includes a plurality of venting cavities 309. As depicted, body 305 includes twenty venting cavities 309 arranged in a grid overlapping with the grid of battery cavities 306 such that each venting cavity 309 is disposed between diagonally-neighbouring battery cavities 306. As further detailed below, each venting cavity 309 is for receiving gas vented from at least one adjacent battery cavity 306 during a thermal runaway of a battery received in that battery cavity. Each venting cavity 309 is spaced from adjacent battery cavities 306 by a distance of approximately 3.0 mm. Downward sloping open channels 313 connect each venting cavity 309 to its adjacent battery cavities 306, as further discussed below. In other embodiments, body 305 may include a greater number or a fewer number of venting cavities 309, so long as each battery cavity 306 is connected at least one venting cavity 309. In some embodiments, a dedicated venting cavity 309 may be provided for each battery cavity 306. As will be appreciated, providing venting cavities 306 in body 305 reduces the mass of housing 300, which may ease transport of housing 300.

Referencing FIG. 6 along with FIG. 5, removable lid 301 is substantially flat. However, the bottom of removable lid 301 has an array of substantially circular lips 314, each of which registers with one battery cavity 306 when lid 301 is mated to body 305. The circular rim of each battery cavity 306 is chamfered so that a lip 314 will nestle into the rim when lid 301 is mated to body 305. Thus, when lid 301 is mated to body 305, lid 301 closes each battery cavity 306 to form a plurality of battery chambers 308 (FIG. 7) substantially enclosing batteries received in battery cavities 306. Battery chambers 308 are similar to chambers 108 (FIG. 2); for example, each battery chamber 308 defined by lid 301 and body 305 is substantially cylindrical in shape and is sized to fit one format 18650 battery.

The bottom of removable lid 301 also has an array of substantially circular lips 316, each of which registers with one venting cavity 309 when lid 301 is mated to body 305. The circular rim of each cavity 309 is chamfered so that a lip 316 will nestle into the rim when lid 301 is mated to body 305. Thus, when lid 301 is mated to body 305, lid 301 closes each venting cavity 309 to form a plurality of substantially enclosed venting chambers 322 (FIG. 7) for holding gas vented during a thermal runaway of a battery held in an adjacent battery chamber 308. As depicted, each venting chamber 322 is substantially cylindrical in shape, and has a diameter of approximately 9.0 mm and a height approximately equal to the height of battery chambers 308. The size and shape of venting chambers 322 may vary in other embodiments.

As depicted, lips 316 protrude farther from the bottom surface of lid 301 than lips 314. Tapered ribs 318 extend from the protruded end of each lip 316 to each adjacent lip 314. Each tapered rib 318 registers with one downward sloping open channel 313 of body 305 when lid 301 is mated to body 305 to form a substantially enclosed battery chamber venting passageway 320 between a battery chamber 308 and each adjacent venting chamber 322. Channels 313 and ribs 318 both slope at an angle of approximately 57 degrees relative to the bottom surface of lid 301. As such, each passageway 320 is formed to slope downwardly from a battery chamber 308 to an adjacent venting chamber 322 at this angle when battery housing 300 is oriented horizontally.

Lid 301 includes a plurality of through-holes 303 which provide venting chamber venting passageways for venting gas, heat, and pressure in the event of a thermal runaway. As depicted, through-holes 303 are arranged such that a through-hole 303 is provided in each venting cavity 309. In this way, each venting chamber 322 defined by lid 301 and body 305 is connected to a through-hole 303. Each through-hole 303 provides a venting passageway that extends between one venting chamber 322 and the exterior of housing 300. In the depicted embodiment, through-holes 303 have larger diameters than venting passageways 320. In some embodiments, through-holes 303 may be replaced with blind-holes similar to blind-holes 203 (FIG. 4).

Lid 301 is otherwise similar to lid 201 (FIG. 3). For example, lid 301 includes an upward projecting lip 310 similar to lip 210. Lip 310 extends about the perimeter of lid 301 to provide a space above housing 300 when stacked. In another embodiment, housing 300 may alternatively or additionally include a lip that projects downwardly from the bottom of housing 300 to provide a space below housing 300 when stacked. Like lip 210, lip 310 may include one more interruptions, each providing a gap 311 to allow gas and pressure to vent out of the space above/below housing 300 in the event of a thermal runaway of a battery held therein. Lid 301 also includes one or more snap-fit clips 312 similar to snap-fit clips 212. Snap-fit clips 312 allow lid 301 to be securely fastened to body 305.

In some embodiments, body 305 may include a plurality of spaced transverse channels similar to channels 213 of body 205 (FIG. 3). Such channels extend through body 305 beneath battery cavities 306 and venting cavities 309, and receive cooling conduits that provide thermal communication between the interior and exterior of body 305.

Like housing 200 (FIG. 3), housing 300 may include a plurality of interior electrical connectors that allow some or all of batteries 304 held in housing 300 to be connected according to predefined series and/or parallel arrangements. Housing 300 may also include connectors similar to connectors 102 (FIG. 1B) that allow electrical connections to be made between some or all of batteries 304 and the exterior of housing 300. Electrical connectors may be formed in housing 300 using an insert injection molding process.

Lid 301 and body 305 of housing 300 can be made from the same IFR polymer composite materials suitable for forming lid 101 and body 105 of housing 100 (FIG. 1A), discussed above.

In the event of a thermal runaway of one of batteries 304 held in housing 300 (hereinafter, the "event" battery 304), gas, heat, and pressure from the event battery 304 are discharged into the battery chamber 308 holding that battery (hereinafter, the "event" chamber 308). This will cause the IFR material surrounding the event chamber 308 to increase in temperature. When this temperature reaches the SET of the IFR material, the material will expand and char.

The expansion ratio of the IFR material surrounding the event chamber 308 is sufficient to cause expanding char to occupy any space in the event chamber 308, and thereby drive out gas from the event chamber 308 to adjacent venting chambers 322 by way of sloping venting passageways 320. Any developing fire in the event chamber 308 is thereby quickly quenched. Further, after gas has been driven out of the event chamber 308, the expanded char seals venting passageways 320 connected to the event chamber 308, and thereby entombs the event battery 304 within the event chamber 308, forming a "dead cell."

Gas vented into a venting chamber 322 from the event chamber 308 is further vented to the exterior of housing 300 by way of a through-hole 303. The slope of venting passageways 320 connecting other battery chambers 308 to the event chamber 308 increases the back pressure on the expanding gases from event battery 304. This increased back pressure, along with the fact that venting passageways 320 have smaller diameters than through-holes 303, help to direct these gases out of housing 300 by way of through-holes 303. When the IFR material around a through-hole 303 is heated to its SET, this material will expand and char to seal the through-hole 303. Similarly, when the IFR material around venting passageways 320 connecting the event battery chamber 308 to other batteries chambers 308 is heated to its SET, this material will expand and char to seal these venting passageways 320.

In embodiments where through-hole 303 is replaced by a blind-hole, gas may accumulate in venting chamber 308 until increasing pressure in a venting chamber 308 causes the blockage blocking the venting passageway of the blind-hole to fail, thereby converting the blind-hole to a through-hole. In embodiments where through-holes 303 are omitted and not replaced by blind-holes, gas that accumulates in a venting chamber 322 is retained therein until lid 301 is removed, e.g., when housing 300 is serviced.

Quickly quenching any developing fire in chamber 308 mitigates heat generation of a thermal runaway, as does the endothermic nature of the intumescent reaction. Meanwhile, charring of body 305/lid 301 improves thermal insulation around chamber 308. Further, as noted above, the slope of venting passageways 320 and the fact that venting passageways 320 have smaller diameters than through-holes 303 helps to direct gases generated by event battery 304 out of housing 300 by way of through-holes 303. This reduces flow of such gases from venting chambers 309 to adjacent battery chambers 308. Each of these mechanisms minimizes the heat conducted to other batteries 304, and prevents a thermal runway of battery 308 from inducing thermal runaway of those other batteries.

Conveniently, as event chamber 308 vents into adjacent venting chambers 322 rather than directly to the exterior of housing 300, flames/sparks escaping from event chamber 308 may be contained inside the adjacent venting chambers 322. This helps to prevent fire from spreading to the exterior of housing 300.

Optionally, during use, battery housings (e.g., housings 200 or 300) may be covered by a rigid fire-resistant plate or mat to protect any flammable materials placed on top of the housing in the event of a thermal runaway. This plate or mat can be made from the same IFR polymer composites discussed above, or other thermally-insulative materials know to those of ordinary skill in the art. The plate or mat may rest atop upwardly projecting lips 210/310 such that space is provided between the plate or mat and the top of the battery housing to allow venting.

Figure 8:
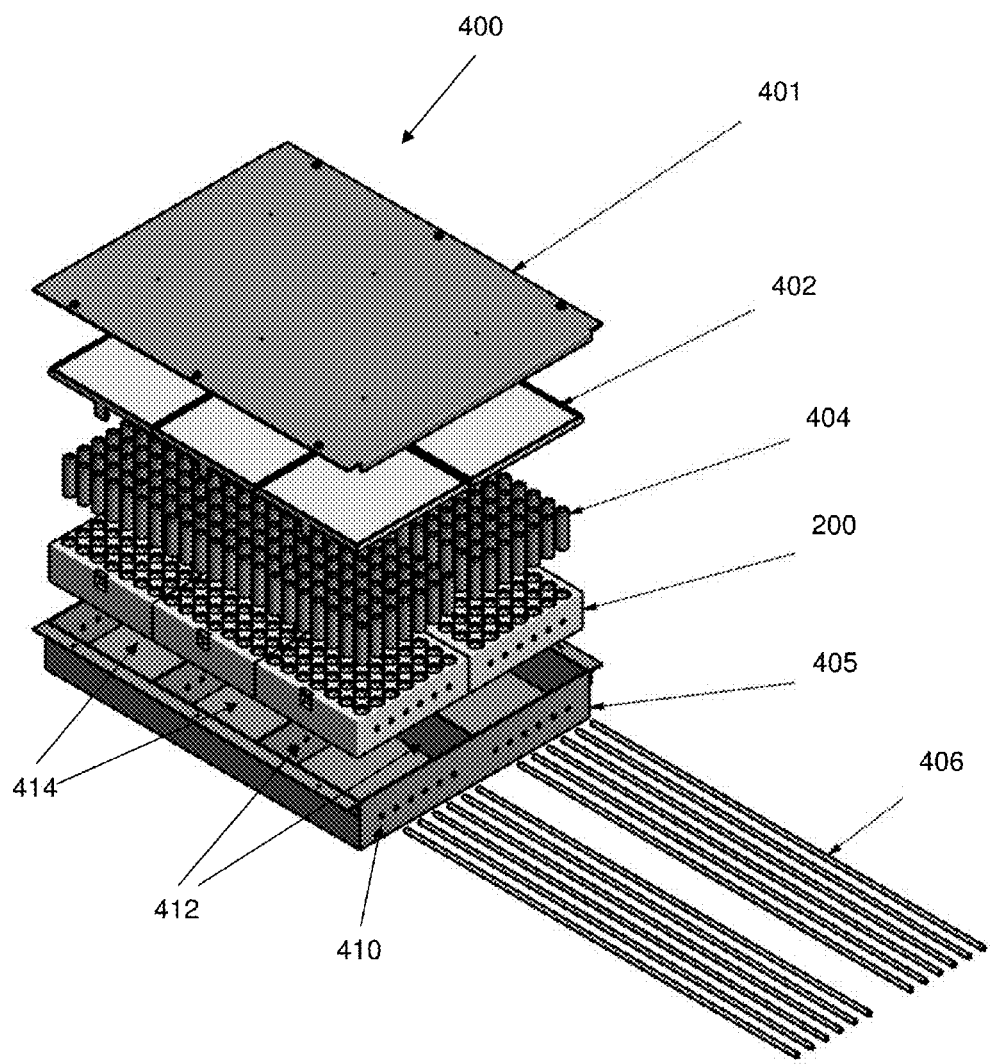
FIG. 8 is an exploded perspective view of a casing and a plurality of the battery housings of FIG. 3.

FIG. 8 depicts a casing 400 for encasing multiple battery housings, e.g., multiple housings 200. Casing 400 includes a body 405 and a removable lid 401. As depicted, body 405 includes interior walls 412 that, along with exterior walls 410 of body 405, define six compartments 414, each for receiving one housing 200. Interior walls 412 and exterior walls 410 include holes that align with channels 213 of battery housing 200 received by compartments 414 such that cooling conduits 406 may be extended through interior walls 412, exterior walls 410 and one or more housings 200 along the length of casing 400.

Lid 401 and body 405 can be made using steel, or another material that provides suitable mechanical rigidity. Lid 401 and body 405 may also be made from material to allow casing 400 to withstand explosions, including explosions of batteries within casing 400 and external explosions. Other suitable materials will also be readily apparent to those of ordinary skill in the art, such as, for example, carbon fiber/fiberglass reinforced polymer composites, ceramics, or the like. Lid 401 is securely fastenable to body 405 by screws (not shown). Other suitable fasteners that provide the above-mentioned mechanical rigidity or explosion-resistance to casing 400 may also be used.

When housings 200 are received in compartments 414 of body 405 and lid 401 is mated to body 405, upwardly projecting lips 210 of housings 200 provide a space between each housing 200 and lid 401. During a thermal runaway, gas, pressure, and heat may be discharged from one of housings 200 to this space. This gas, pressure, and heat may be retained in this space in embodiments where casing 400 is substantially sealed. In other embodiments, casing 400 may include holes or gaps that allow gas, pressure, and heat to be vented to the exterior of casing 400.

Although the casing 400 holds only one layer of battery housings, in other embodiments, casing 400 can be modified to hold multiple layers of battery housings such that sufficient voltage, current, and power can be supplied from one casing 400 to satisfy the requirements a large device such as, for example, an electric car, an aircraft, or a submarine.

In other embodiments, casing 400 may be modified to encase other battery housings such as, e.g., housing 300. For example, the exterior and interior walls of casing 400 could be modified to resize compartments 414 to receive such other housings.

Figure 9A:
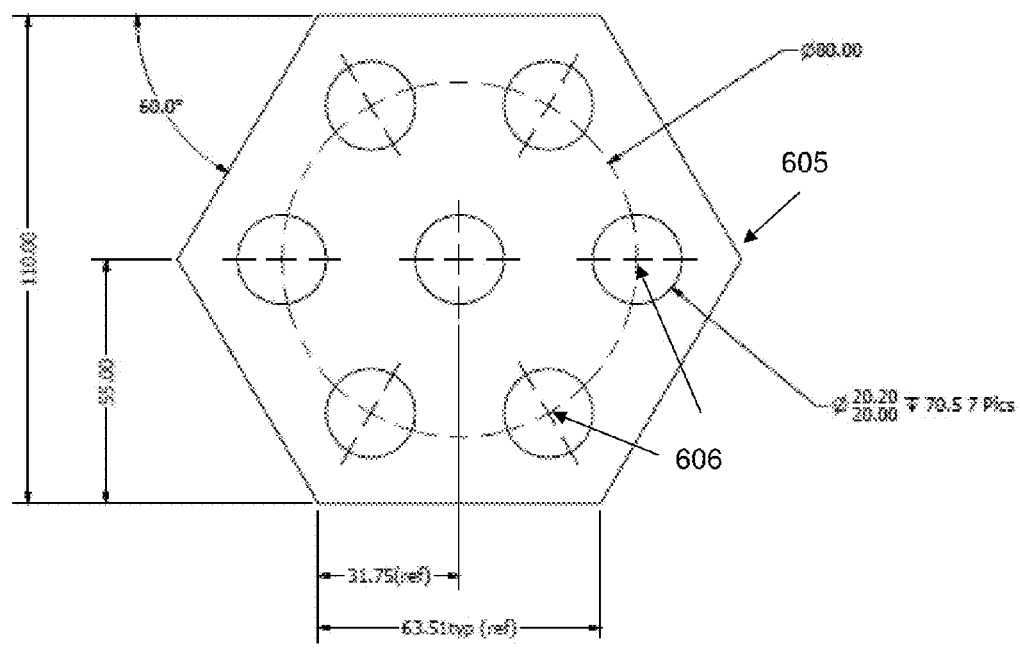
FIG. 9A is a top view of a battery housing body adapted to house seven batteries.
Figure 9B:
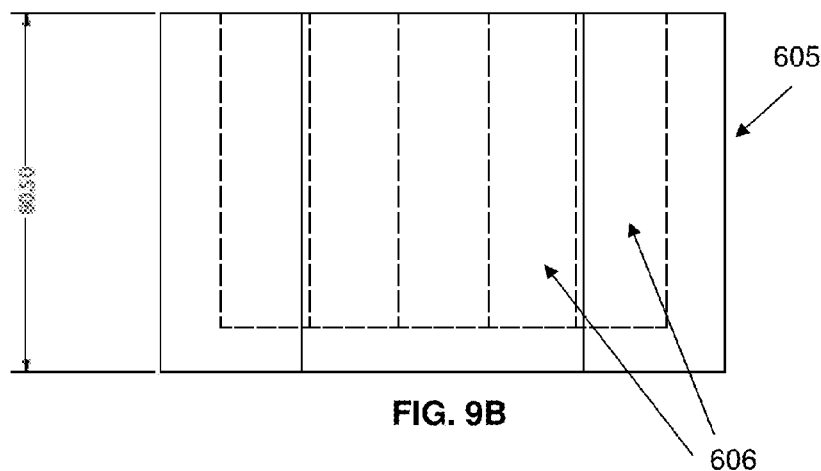
FIG. 9B is the side elevation view of the battery housing body of FIG. 9A.
Figures 10A, 10B:
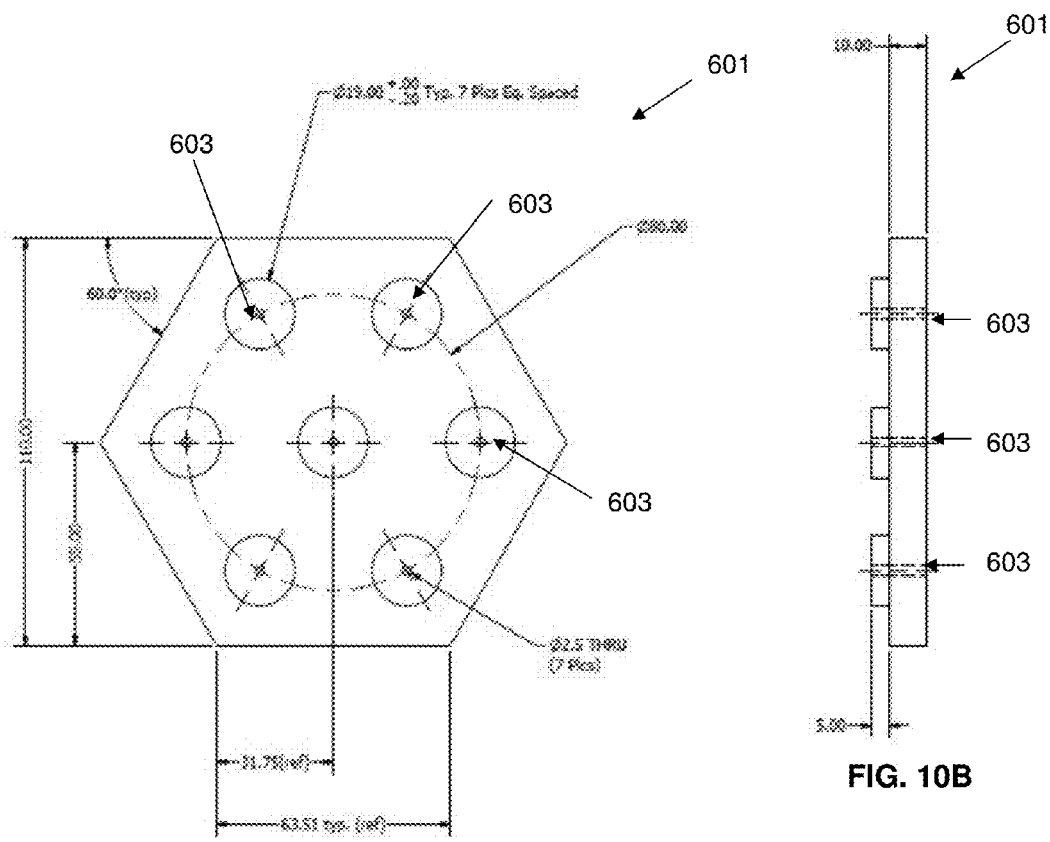
FIG. 10A is a bottom view of a battery housing lid matable with the battery housing body of FIG. 9A.
FIG. 10B is a side elevation view of the battery housing lid of FIG. 10A.

The operation of battery housings disclosed herein is further described with reference to tests conducted using a battery housing, as depicted in FIGS. 9A/9B and 10A/B. FIGS. 9A and 9B are respectively top and side elevation views of body 605 of the housing. FIGS. 10A and 10B are respectively bottom and side elevation views of lid 601 of the housing.

As best seen in FIG. 9A, the battery housing has seven cavities 606, each for receiving one format 18650 battery. As depicted, body 605 is hexagonal in shape, and cavities 606 are arranged in body 605 such that they are substantially equidistant from each other, e.g., at a distance of approximately 20 mm. As best seen in FIG. 10A, lid 601 includes a plurality of through-holes 603. Each through-hole 603 is aligned with one of the seven cavities 606 and provides a venting passageway for venting one of the seven substantially enclosed chambers formed when lid 601 is mated to body 605. Through-holes 603 are otherwise similar to through-holes 103 (FIG. 1A).

Lid 601 and body 605 are formed using an IFR polymer composite material having the following composition, by weight percentage:

Intumescent powder: 30.0%;
High density polyethylene (HDPE): 42.0%;
Antioxidant: 0.2%;
Fusabond™ E265: 3.0%;
Titanium dioxide: 1.5%;
Brominated polyethylene: 17.5%;
Antimony trioxide: 5.8%.

The intumescent powder is a blowing agent manufactured according to the processes described in aforementioned U.S. Pat. No. 6,645,278. The antioxidant improves the thermal stability of the HDPE and the brominated polyethylene for melt processing. Fusabond™ E265 is an anhydride modified high density polyethylene from DuPont™, which functions as a compatibilizer in the composite to improve adhesion among different components. Titanium dioxide inhibits smoke and improves the whiteness of the final articles. Brominated polyethylene is a fire retardant with excellent processability and compatibility. Antimony trioxide synergizes with bromine to improve the fire retardant effect.

To form the IFR material for lid 601 and body 605, the powder and pellets of the different components were weighed stoichiometrically and mixed. The mixture was then compounded at 170° C. in a single-screw extruder and pelletized. The composite pellets were then injection molded to form lid 601 and body 605.

The battery housing of FIGS. 9A/9B, 10A/10B was tested by simulating a thermal runaway of a battery held therein. Lid 601 and body 605 were subjected to ambient condition for over 48 hours prior to testing. Testing was carried out at an ambient temperature of 24° C. and a relative humidity of 21%.

Figure 11:
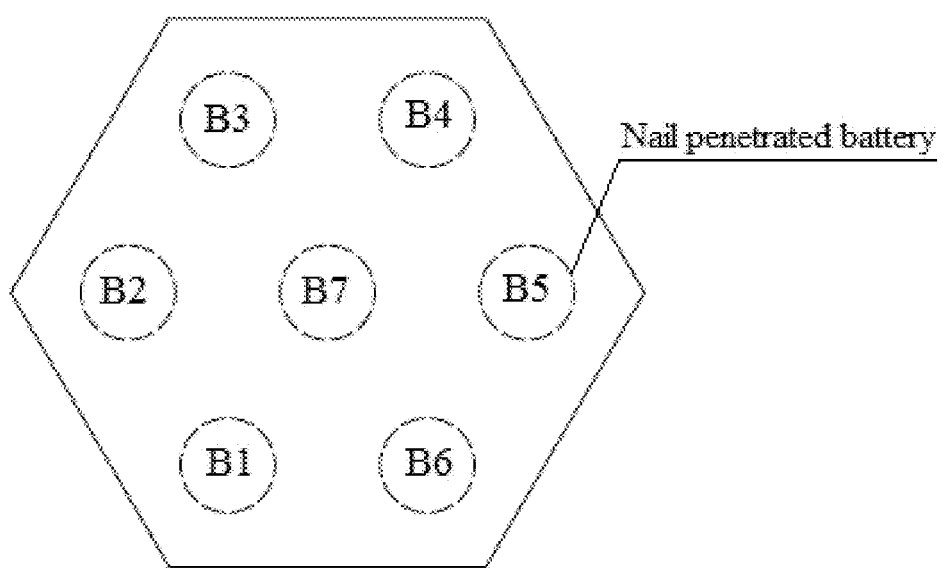
FIG. 11 is a top view of the battery housing body of FIG. 9A.

Two tests were conducted. In the first test, a heating cartridge was placed in central cavity B7 of the battery box of body 605 (FIG. 11). Six format 18650 lithium ion (lithium-ion-cobalt) batteries were placed in the six peripheral cavities B1-B6 of body 605. A thermocouple was placed inside each cavity to measure temperature during the test. The thermocouple in each peripheral cavity was attached to the battery placed in that cavity at a location closest to the central cavity B7 to obtain the highest temperature measurement.

Lid 601 was then securely fastened to body 605 using a plurality of screws (not shown), thereby enclosing the heating cartridge and the six batteries respectively within seven chambers defined by lid 601 and body 605.

The heating cartridge was then heated at 130° C./min to 653.4° C., and then immediately deactivated. Total heating duration was approximately 5 minutes. This duration was chosen to be far longer than the expected duration of a thermal runaway of a lithium ion battery, which typically lasts for approximately 30 to 55 seconds. Acquisition of temperature measurements by way of the thermocouples in each chamber was started before the heating cartridge was activated, and stopped after all the thermocouples showed decreasing temperature. The highest temperature measured by each thermocouple is shown in TABLE 1, below. Of note, the highest temperature for each of the batteries was recorded five minutes after the heating cartridge was deactivated.

TABLE 1

| Thermo-couple | Heating cartridge | Battery #1 | Battery #2 | Battery #3 | Battery #4 | Battery #5 | Battery #6 |
|---|---|---|---|---|---|---|---|
| Temperature (° C.) | 653.4 | 34.2 | 35.3 | 34.0 | 37.7 | 28.5 | 31.5 |

After removing lid 601 of the housing, all six batteries held in the peripheral chambers (corresponding to cavities B1-B6 of FIG. 11) were observed to be intact. Meanwhile the heating cartridge held in the central chamber (corresponding to cavity B7 of FIG. 11) was surrounded by a thick layer of char. The char was produced by heating the IFR polymer composite material of lid 601 and body 605 to a temperature above the SET of the intumescent powder (i.e., approximately 200° C.), thereby causing the IFR material to intumesce.

The simulated thermal runaway in the central chamber did not increase temperatures in the peripheral chambers sufficiently to cause a thermal runaway of any of the batteries held in the peripheral chambers. As shown in TABLE I, the highest temperature measured within the peripheral cavities was only 37.7° C., well below the 232° C. threshold at which thermal runaway of lithium ion batteries is typically initiated. The test results show that char produced in response to the simulated thermal runaway and the material of lid 601/body 605 separating the chambers provided thermal insulation around the heating cartridge that greatly reduced heat transfer from the heating cartridge to the peripheral chambers. Further, the above-noted five minute delay between deactivation of the heating cartridge and measurement of the highest temperature in each of the peripheral chambers also evidences the effectiveness of the thermal insulation.

The second test was a nail-penetration test. In this test, a real thermal runaway and explosion of a battery held in the housing was induced. In particular, a battery having a 100% state of charge was penetrated with a metal nail to cause an internal short circuit. The effect of the induced thermal runaway and explosion event on other batteries held in the housing was observed.

Seven format 18650 lithium ion (lithium-ion-cobalt) batteries were placed into the seven cavities B1-B7 of housing body 605 (FIG. 11). Battery #5 placed in cavity B5 had a 100% state of charge. A thermocouple was attached to the surface of each of the seven batteries to measure temperature during the test. All of the thermocouples except the one attached to battery #5 were positioned at a location closest to cavity B5 to obtain the highest temperature measurement.

Again, lid 601 was securely fastened to body 605 using a plurality of screws (not shown), thereby enclosing the seven batteries respectively within seven chambers defined by lid 601 and body 605.

A metal nail was drilled through body 605 to penetrate battery #5 and cause an internal short circuit. Acquisition of temperature measurements was started before penetration, and stopped after all the thermocouples showed decreasing temperatures. The highest temperature measured by each thermocouple is shown in TABLE 2, below.

TABLE 2

| Thermocouple | Battery #5 (shorted) | Battery #1 | Battery #2 | Battery #3 | Battery #4 | Battery #6 | Battery #7 |
|---|---|---|---|---|---|---|---|
| Temperature (° C.) | 743.8 | 26.3 | 24.6 | 26.0 | 39.6 | 40.0 | 37.4 |

The results show that a thermal runaway was successfully triggered in battery #5 upon being penetrated by the metal nail. This thermal runaway caused battery #5 to reach a peak temperature of 743.8° C. Gas, spark, and smoke vented from the through-hole 603 connected to chamber B5 holding battery #5 for approximately 15 seconds, after which the through-hole 603 was sealed. This venting period was much shorter than the typical thermal runaway period (30 to 55 seconds) of a lithium ion battery. The shorter venting period indicated that the thermal runaway was quenched by the expanding char at an early stage.

After gas/smoke finished venting from the through-hole 603, the intumescing IFR material sealed off through-hole 603, the interface between lid 601 and body 605, as well as the hole created by the penetrating nail. The highest temperature measured in any of the chambers excluding the chamber holding battery #5 was 40.0° C., far below the 232° C. typically required to induce a thermal runaway event.

Upon removing lid 601 following the test, it was observed that battery #5 was fully embedded in char, forming a "dead cell". At the same time, the six other batteries remained intact. Further, the housing, aside from the intentional penetration, maintained its overall structural integrity.

Although through-holes (e.g., through-holes 103, 303, and 603) and blind-holes (e.g., blind holes 203) are shown to be located on the lid of battery housings in the depicted embodiments, through-holes and blind-holes can also be located in the body of battery housings, e.g., at the bottom or sides of the body. Further, the number of through-holes and blind-holes can vary, so long as at least one through-hole or blind-hole is provided to allow venting from each chamber for holding a battery. In the depicted embodiment, through-holes and blind-holes are shown to be round in shape. However, in other embodiments, through-holes and blind-holes may have another shape; for example, they may be slits. Any through-holes may be replaced with blind-holes, and conversely, any blind-holes may be replaced with through-holes.

Although chambers (e.g., chambers 108, 308, and 608) of the battery housings are shown to adapted to hold a format 18650 battery, in other embodiments, chambers can be adapted to hold any other type of primary or secondary batteries or cells, of difference sizes, configurations and chemistries. Further, although each chamber is shown to be adapted to hold only one battery, in other embodiments, a chamber could be adapted to hold multiple batteries, e.g., stacked end-on-end or placed side-by-side.

In the embodiments of FIGS. 3 and 4; FIGS. 5 to 7, and FIGS. 9A to 11, the, lids (e.g., lids 201, 301, and 601) and bodies (e.g., body 205, 305, and 605) of battery housings were described as fabricated of an IFR material. However, in other embodiments, a lid and/or a body could be partly fabricated of other materials. For example, similar to the embodiment of FIG. 2A, a body could incorporate liners fabricated of an IFR material at each battery chamber. In such instance, the IFR material of the liners is chosen to have an expansion ratio sufficient to drive out gas from a battery chamber and seal the battery chamber in the event of thermal runaway of a battery held in that chamber. As with the embodiment of FIG. 2A, the liners may be an integral part of the body or a separable part of the body. Where the liners are separable, they could be formed of a flexible IFR foam and removed from the battery housings to be wrapped around each battery before the batteries/liners are placed inside the battery housings.

In the depicted embodiments, cooling conduits (e.g., conduits 406) are shown to extend transversely. However, the arrangement of cooling conduits can be changed to any other arrangement (e.g., running at a bias with respect to the sidewalls of the housing).

Optionally, any of the battery housings and casings disclosed herein may be lined with ceramic or other fire-resistant fabrics (e.g., Kaowool™, basalt, Nextel™, and Nomex™), to improve flame penetration and thermal insulation performance.

In the foregoing, the term "battery" refers to any type of primary or secondary cell or battery.

The above described embodiments are intended to be illustrative only and in no way limiting. The described embodiments are susceptible to many modifications of form, arrangement of parts, details and order of operation, as will be appreciated by one of skill in the art. The invention is intended to encompass all such modification within its scope, as defined by the claims.

What is claimed is:

1. A battery housing comprising:
   a body; and
   a lid mateable with said body;

said body and said lid, when mated, providing:
- a plurality of battery chambers, each battery chamber dimensioned to hold at least one battery,
- a plurality of venting chambers,
- a plurality of first venting passageways, each first venting passageway extending from a battery chamber of said plurality of battery chambers to a venting chamber of said plurality of venting chambers, and
- a plurality of second venting passageways, each second venting passageway avoiding said battery chambers and extending from a venting chamber of said plurality of venting chambers to an exterior of said housing;

at least a portion of at least one of said body and said lid comprising an intumescent flame retardant material with an expansion ratio sufficient to drive gas from any given battery chamber of said plurality of battery chambers through at least one of said plurality of first venting passageways, and seal said given battery chamber, when said material intumesces in the event of thermal runaway of a battery housed in said given battery chamber.

2. The battery housing of claim 1, wherein said each first venting passageway is a tubular channel sloping from one said battery chamber to one said venting chamber.

3. The battery housing of claim 2, wherein said body comprises a plurality of open channels and said lid comprises a plurality of ribs, each of said open channels registering with one of said ribs to form one of said first venting passageways when said body and said lid are mated.

4. The battery housing of claim 2 wherein, when said body and said lid are mated, said sloping is such that an end of said tubular channel at said one said battery chamber is closer to said lid than an end of said tubular channel at said one said venting chamber.

5. The battery housing of claim 1 wherein each said second venting passageway has a larger diameter than said each first venting passageway.

\* \* \* \* \*